United States Patent [19]

Hofmann et al.

[11] Patent Number: 4,590,567
[45] Date of Patent: * May 20, 1986

[54] LARGE ANGLE, GRAVITY COMPENSATED, BANK-TO-TURN PURSUIT CONTROLLER

[75] Inventors: Lee G. Hofmann, Vestal; Charles J. Dittmar, Jr., Binghamton, both of N.Y.

[73] Assignee: General Electric Company, Binghamton, N.Y.

[*] Notice: The portion of the term of this patent subsequent to Apr. 16, 2002 has been disclaimed.

[21] Appl. No.: 709,477

[22] Filed: Mar. 7, 1985

Related U.S. Application Data

[62] Division of Ser. No. 336,910, Jan. 4, 1982, Pat. No. 4,511,972.

[51] Int. Cl.$^4$ .......................... G06F 15/50; G06G 7/78
[52] U.S. Cl. .................................... 364/434; 244/3.21
[58] Field of Search ............................... 364/433–435, 364/443–444, 453–454, 457, 462; 244/3.1, 3.15, 3.21, 17.13; 318/584–586

[56] References Cited

U.S. PATENT DOCUMENTS

| | | | |
|---|---|---|---|
| 3,565,370 | 2/1971 | Moller | 364/434 |
| 4,019,702 | 4/1977 | Annin | 364/433 |
| 4,111,382 | 9/1978 | Kissinger | 244/3.15 |
| 4,114,842 | 9/1978 | Hofferber et al. | 364/434 |
| 4,234,142 | 11/1980 | Yost et al. | 244/3.21 |
| 4,254,465 | 3/1981 | Land | 364/453 |
| 4,312,039 | 1/1982 | Skutecki | 244/17.13 |
| 4,343,035 | 8/1982 | Tanner | 364/457 |
| 4,357,663 | 11/1982 | Robbins et al. | 364/433 |
| 4,377,848 | 3/1983 | Flannigan et al. | 364/434 |
| 4,392,203 | 7/1983 | Fischer et al. | 364/434 |

Primary Examiner—Gary V. Harkcom
Attorney, Agent, or Firm—I. David Blumenfeld

[57] ABSTRACT

A bank-to-turn pursuit controller provides rapid and precise pursuit steering control toward a target point with direction substantially different from the vehicle direction of travel using positive lift load factors between zero and a specified maximum to generate commands which rotate the vehicle toward the target point at every instant of time.

2 Claims, 10 Drawing Figures

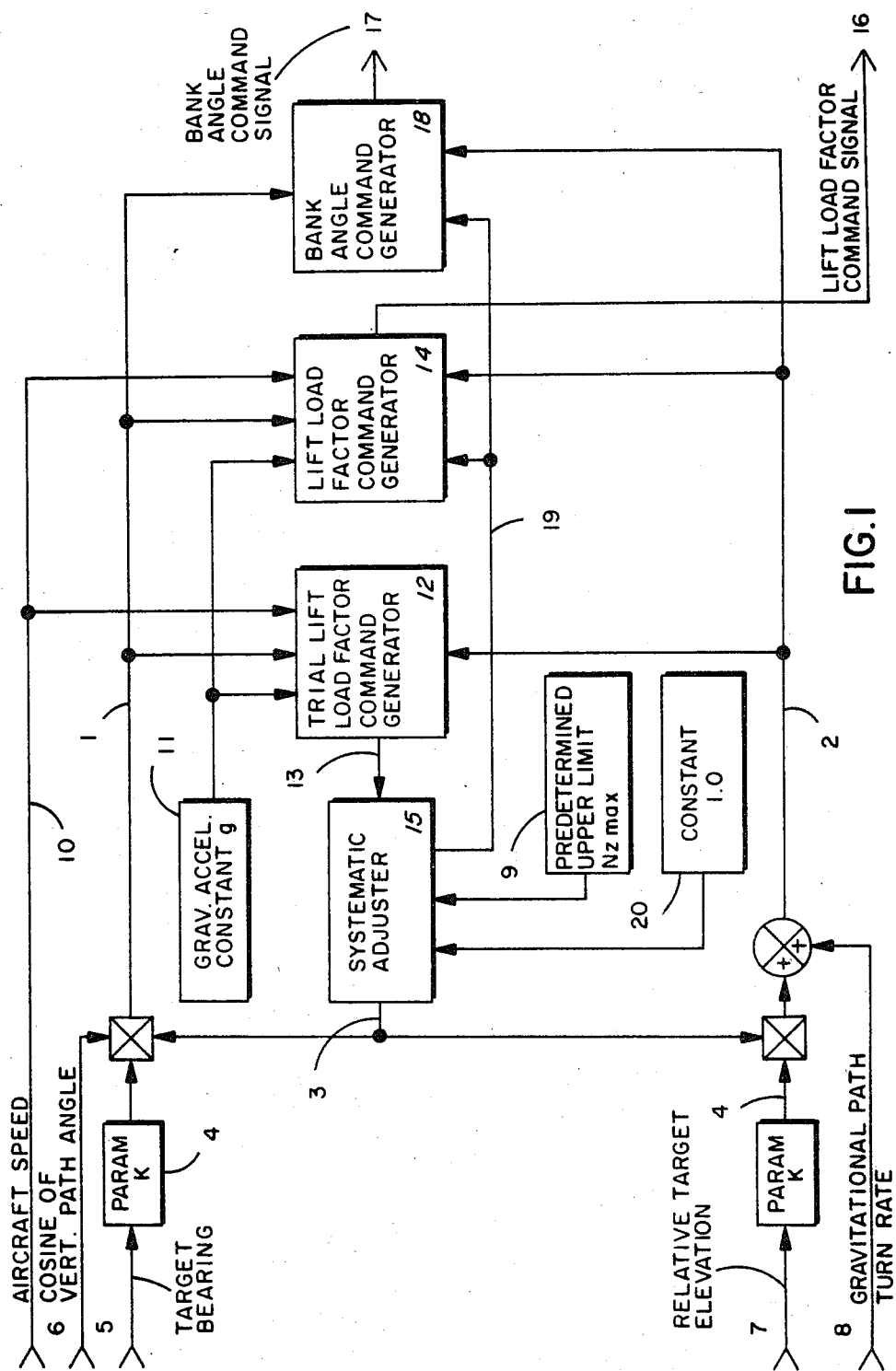

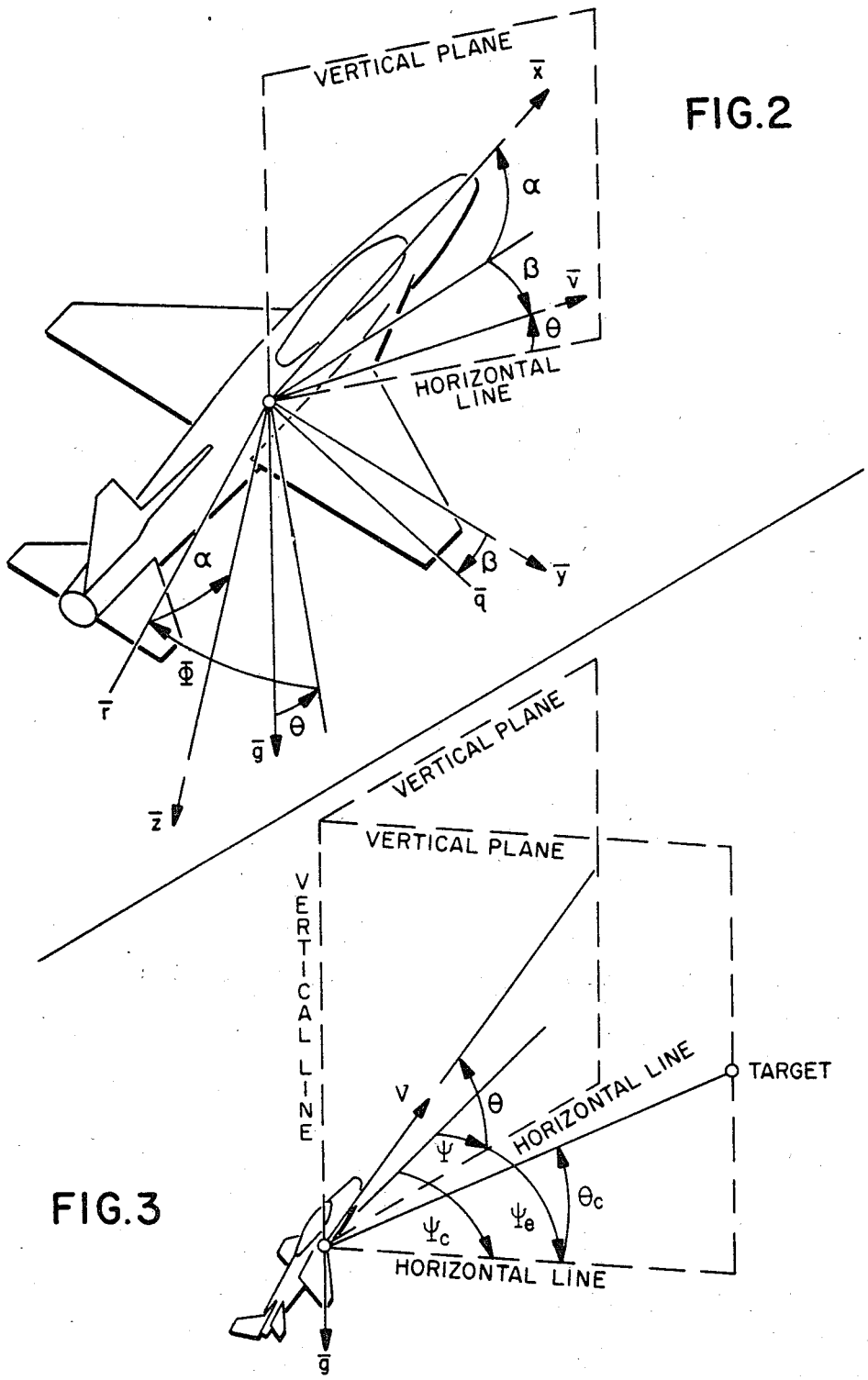

LARGE ANGLE, GRAVITY COMPENSATED, BANK-TO-TURN PURSUIT CONTROLLER

The Government has rights in this invention pursuant to Contract No. F33615-79-C-3622 awarded by the Department of the Air Force.

This application is a division of application Ser. No. 336,910, filed Jan. 4, 1982, now U.S. Pat. No. 4,511,972.

BACKGROUND OF THE INVENTION

1. Field of the Invention

This invention relates to bank-to-turn pursuit controllers for fixed wing aircraft and missiles, and more particularly, to such a pursuit controller capable of providing rapid and precise pursuit steering control for substantially lift supported vehicles operating in the presence of a gravitational field.

2. Description of the Prior Art

Present bank-to-turn pursuit controllers for fixed wing aircraft and missiles use ad hoc corrections to compensate for gravitational influence. These consist of "gravity bias" and "up elevator" corrections applied within the controller. Total lift load factor is limited by a saturation element in the command path. Bank angle commands are developed in a manner that bank angle motion of the aircraft interacts in an intimate way with the bank angle and lift load factor commands generated by the pursuit controller.

The nature of the above features limits the utility of the present bank-to-turn pursuit controllers to applications wherein vertical path angles are modest (e.g., ±30 degrees), wherein bank angles used are modest (e.g., ±60 degrees), and wherein the angular separation between the aircraft direction of travel and the direction of the target point is modest (e.g., ±30 degrees).

Consequently, therefore, a need exists for a large angle, gravity compensated bank-to-turn pursuit controller.

It is therefore an object of the present invention to provide a bank-to-turn pursuit controller which is effective for essentially all vertical path angles except zenith and nadir.

It is a further object of the present invention to provide a bank-to-turn pursuit controller capable of utilizing the full range of aircraft bank angles.

It is a further object of the present invention to provide such a bank-to-turn pursuit controller which is equally effective for pursuit steering toward a target point with direction substantially different from the vehicle direction of travel as well as toward a target point which is in a direction nearly the same as the vehicle direction of travel.

It is a still further object of the present invention to provide a bank-to-turn pursuit controller which eliminates the need to use negative lift and which uses no more positive lift than an amount selected as an upper limit.

It is a still further object of the present invention to provide such a bank-to-turn pursuit controller which provides precise compensation for gravitational influence upon the lift magnitude and orientation required for pursuit steering and which provides commands to rotate the vehicle direction of travel toward the target point in a systematic manner at every instant of time.

Other objects and advantages of the present invention will become apparent as the description thereof proceeds.

SUMMARY OF THE INVENTION

In accordance with the present invention, there is provided a system for accomplishing bank-to-turn pursuit steering of an aircraft. Included are means for generating a lift-load factor attenuation signal and means for generating first and second signals representing the components of commanded path turn rate compensated for gravitational path turn rate, the first and second signals being dependent upon the lift load factor attenuation signal. Also included are means for generating a lift load factor command signal which is less than or equal to a predetermined upper limit, the generating means having inputs of the first and second signals. Also included are means for generating a bank angle command signal appropriate for use with the lift load factor command signal, the generating means having inputs of the first and second signals.

BRIEF DESCRIPTION OF THE DRAWING

In the accompanying drawing:

FIG. 1 shows in block diagram form the interrelation of the various components of the bank-to-turn pursuit steering controller in accordance with one form of the preferred embodiment of the present invention;

FIG. 2 shows the orientation relationship among aircraft body axes; $\bar{x}$, $\bar{y}$, $\bar{z}$; aircraft flight path axes; $\bar{v}$, $\bar{q}$, $\bar{r}$; and gravitational vertical, $\bar{g}$, in terms of the angles of attack, $\alpha$; sideslip, $\beta$; and vertical path angle, $\theta$; and bank angle, $\phi$;

FIG. 3 shows definitions of aircraft vertical path angle, $\theta$ (i.e., elevation of aircraft direction of travel), target relative bearing, $\psi_e$, and elevation of the line of sight from aircraft to target, $\theta_c$;

DESCRIPTION OF THE PREFERRED EMBODIMENT

Figure 4:
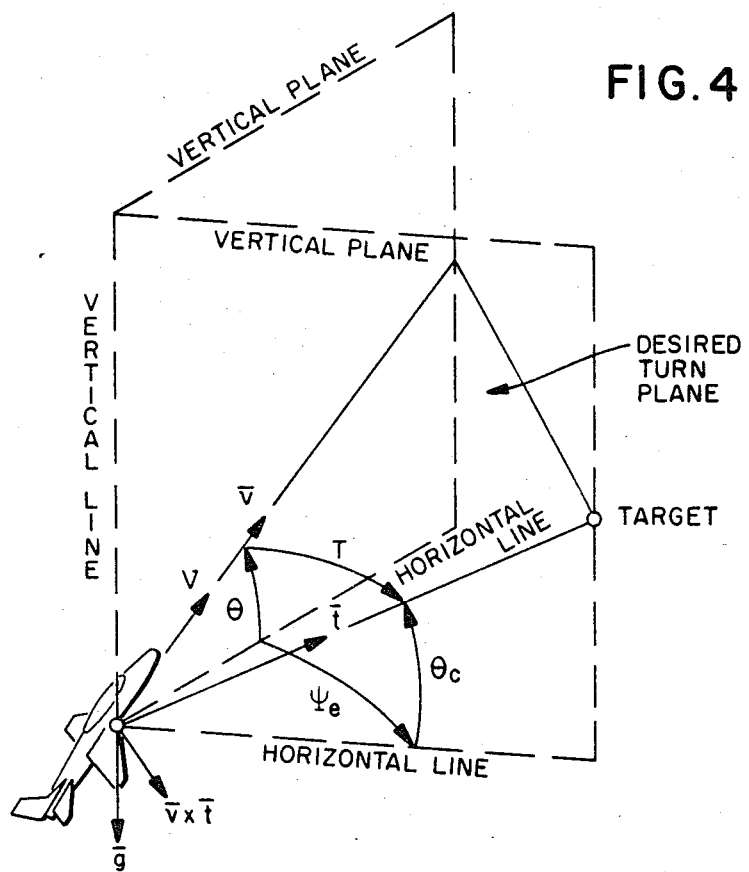
FIG. 4 shows the geometry of the desired aircraft turn plane for another form of the preferred embodiment of the present invention, as established by unit vectors in the aircraft direction of travel, $\bar{v}$, and in the direction of the line of sight, $\bar{t}$, from aircraft to target, as well as defining the target angle, T.

In accordance with the present invention, and referring now to FIG. 1 of the drawing, there is shown, in block diagram form, the preferred embodiment of the large angle, gravity compensated, bank-to-turn pursuit controller of the present invention. Means are provided for generating first and second signals representing the components of commanded path turn rate compensated for gravitational path turn rate, the first signal 1 representing the component of commanded path turn rate in the transverse plane and the second signal 2 representing the component of commanded path turn rate in the vertical plane as compensated for gravitational path turn rate 8. First and second signals 1 and 2 are dependent upon a lift load factor attenuation signal 3, which is generated in a systematic adjuster 15. Means are provided for generating a lift load factor command signal 16 and such may take the form of lift load factor command generator 14 which has inputs of first signal 1 and second signal 2 as well as signals representing aircraft speed 10, gravitational acceleration constant 11 and an enabling signal 19. Lift load factor command signal 16 is less than or equal to a predetermined upper limit 9.

Means are also provided for generating a bank angle command signal 17 appropriate for use with the lift load factor command signal 16, and such may take the form of bank angle command generator 18, which has inputs of the first and second signals 1 and 2 respectively, and the enabling signal 19.

Means are provided for generating a trial lift load factor command signal 13 which takes the form of trial lift factor command generator 12 having inputs from the first and second signals 1 and 2. Means are also provided for comparing the trial lift load factor command signal 13 with a predetermined upper limit 9 and for modifying lift load factor attenuation signal 3 when signal 13 exceeds the predetermined upper limit and such may take the form of systematic adjuster 15.

Two distinct definitions for first and second signals are given. The first and second signals represent the components, in a roll stabilized axis system, of commanded path turn rate in the transverse and vertical planes, respectively. For the purposes of the present invention, the vertical and transverse planes containing the commanded path turn rate components are each understood to contain the aircraft velocity vector, and the transverse plane is further understood to be perpendicular to said vertical plane. Further, for the purposes of the present invention, the terms "path turn rate" and "angular velocity of the aircraft velocity vector" are interchangeable. Still further, the aircraft direction of travel is understood to have the direction and sense of the aircraft velocity vector.

In the first of these alternative definitions, the aircraft is steered along a path such that the vertical path angle rate of change is proportional to the difference between the vertical path angle and the elevation of the line of sight from the aircraft to the target as determined in a vertical plane, and path turn rate in the transverse plane bears the same proportional relationship to the bearing of the target with respect to the aircraft direction of travel as determined in the horizontal plane.

Referring to FIG. 1, first signal 1 representing the component of commanded path turn rate in the transverse plane is formed as the product of: a signal 5 representing target bearing angle between a vertical plane containing the aircraft direction of travel and the vertical plane containing the line of sight from the aircraft to the target; a predetermined dynamic performance parameter 4; a signal 6 representing the cosine of vertical path angle; and the lift load factor attenuation signal 3.

Second signal 2 representing the component of commanded path turn rate in the vertical plane as compensated for gravitational path turn rate is formed as the product of: a signal 7 representing the angular difference between target elevation as determined in a vertical plane containing the aircraft and the target, and the elevation of the aircraft direction of travel as determined in a vertical plane; the predetermined dynamic performance parameter 4; and the lift load factor attenuation signal 3; combined with a signal 8 representing gravitational path turn rate.

Figure 10:
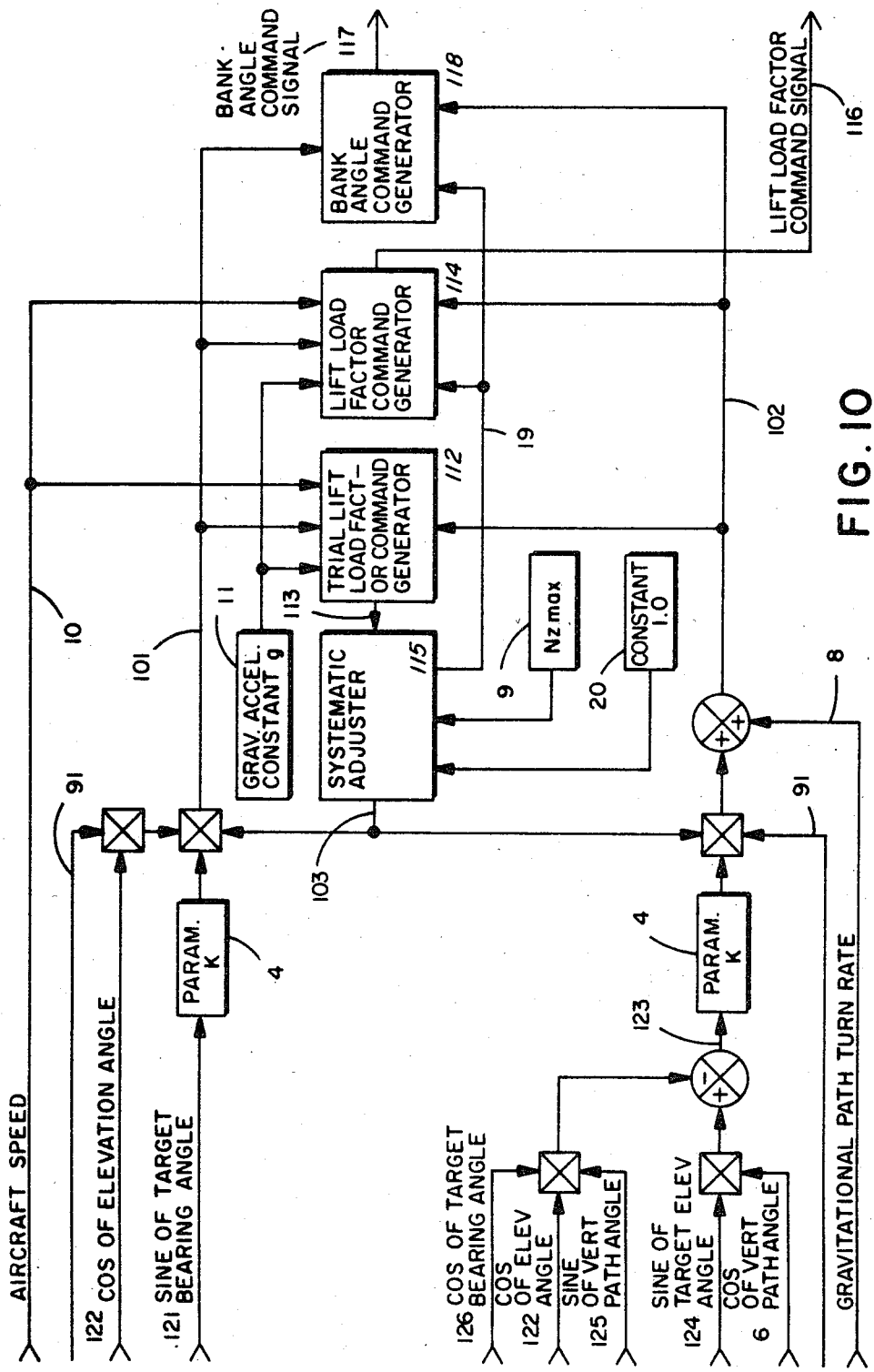
FIG. 10 shows in block diagram form the interrelation of the various components of the bank-to-turn pursuit steering controller in accordance with another form of the preferred embodiment of the present invention.

In the second of the alternative definitions for the first and second signals 101 and 102 of FIG. 10 representing the components of commanded path turn rate in the transverse and vertical planes, respectively; the aircraft is steered such that the aircraft direction of travel is commanded directly toward the target point at every instant of time.

Referring now to FIG. 10, first signal 101 representing the component of commanded path turn rate in the transverse plane is formed as the product of: a signal 121 representing the sine of target bearing angle between a vertical plane containing the aircraft direction of travel and a vertical plane containing the aircraft and the target; a signal 122 representing the cosine of elevation angle for the line of sight from the aircraft to the target as determined in the vertical plane containing said line of sight; a signal 91 representing the ratio of the magnitude of an angle between the aircraft direction of travel and the line of sight from the aircraft to the sine of said angle; a predetermined dynamic performance parameter 4; and the lift load factor attenuation signal 103.

Second signal 102 representing the component of commanded path turn rate in the vertical plane as compensated for gravitational path turn rate is formed as the product of: a third signal 123; the signal 91 representing the ratio of the magnitude of the angle between the aircraft direction of travel and the line of sight from the aircraft to the target to the sine of said angle; the predetermined dynamic performance parameter 4; and the lift load factor attenuation signal 103; combined with a signal 8 representing gravitational path turn rate. The third signal 123 is the product of the signal 6 representing the cosine of the aircraft vertical path angle, and a signal 124 representing the sine of elevation angle for the line of sight from the aircraft to the target as determined in the vertical plane containing said line of sight, combined with the product of a signal 125 representing the sine of the aircraft vertical path angle, the signal 122 representing the cosine of elevation angle for the line of sight from the aircraft to the target as determined in the vertical plane containing said line of sight, and a signal 126 representing the cosine of target bearing angle between a vertical plane containing the aircraft direction of travel and the vertical plane containing the aircraft and the target.

Dynamic performance parameter 4 determines the maximum small signal bandwidth of the pursuit steering controller. Its value is free to be chosen for each particular application. Lift load factor attenuation signal, 3, in FIG. 1 and 103 in FIG. 10, takes on values between zero and one to satisfy the constraint that the positive lift load factor command, 16 in FIG. 1 and 116 in FIG. 10, not exceed predetermined upper limit 9. This upper limit value is free to be chosen for each particular application.

Referring again to FIG. 1, signal 10 representing vehicle speed and the gravitational acceleration constant 11 and first and second signals 1 and 2 are combined in the trial lift load factor command generator 12 to obtain the trial lift load factor command signal 13.

The value used for the lift load factor attenuation signal 3 is unity as inputted at 20 if that value results in a trial lift load factor command signal 13 which is less than or equal the predetermined upper limit 9. If the trial lift load factor command signal 13 exceeds the upper limit 9 for a lift load factor attenuation signal of 1.0, then a lesser positive value for the lift load factor attenuation signal 3 is found by a systematic adjustment procedure in systematic adjuster 15 which results in a trial lift load factor command signal 13 equal to the predetermined upper limit 9. In either event, the final value of the trial lift load factor command signal 13 obtained in the manner above is used as the actual lift load factor command signal 16. The corresponding final values for first and second signals 1 and 2 are used to obtain the bank angle command signal 17. That is, the bank command signal 17 is determined by bank angle command generator 18 such that the transverse component of commanded lift load factor and first signal 1 are in the same proportion to one another as are the component of commanded lift load factor which lies in the vertical plane containing the vehicle direction of travel and second signal 2.

The following is a description of the mathematical theory underlying the design of the command generation circuits in FIGS. 1, 5, 6, 7, 8, 9, and 10, and reference should be made generally thereto.

Q,R: Pitch and yaw rates, respectively, of the aircraft velocity vector
V: Aircraft speed
g: Gravitational acceleration
$\phi$: Aircraft bank angle
$\theta,\psi$: Absolute elevation and bearing, respectively (for aircraft velocity vector without subscript, for target point with c subscript)
( ): Derivative with respect to time of ( )
$( )_c$: Commanded value of ( )
k: Lift load factor attenuation parameter
K: Dynamic performance parameter (small-signal control bandwidth)
$N_z$: Aircraft lift load factor
$N_{zc}^*$: Modified aircraft lift load factor command
T: Magnitude of angle between aircraft direction of travel and line of sight from the aircraft to the target
P: Roll rate of aircraft about its velocity vector
$\pi$: Constant, 3.1416...
$\bar{v}$: Unit vector in the aircraft direction of travel
$\bar{t}$: Unit vector in the direction of the line of sight from aircraft to target
F: Scale factor
C: Cosine of angle, T
$( )_{V,q,r}$: Aircraft flight path axis components of the vector, ( ), respectively
$\bar{T}$: Vector representation of angle between aircraft direction of travel and line of sight from aircraft to target
$\alpha,\beta$: Aircraft angles of attack and sideslip, respectively
$\bar{x},\bar{y},\bar{z}$: Unit vectors defining the aircraft body-fixed axis coordinate system
$\bar{g}$: Gravity vector
$\bar{V}$: Aircraft velocity vector The relationship between aircraft body-fixed axes and aircraft flight path axes is described in terms of the aircraft angles of attack, $\alpha$, and sideslip, $\beta$. These axis systems and angles are shown in relation to an aircraft in FIG. 2. The orientation of the aircraft flight path axis system relative to gravitational vertical, $\bar{g}$, is established by aircraft bank angle, $\phi$, and vertical path (or elevation) angle, $\theta$. Orientation of the aircraft flight path axes to the gravitational vertical is also shown in FIG. 2.

In coordinated flight, lateral acceleration (normal to the aircraft plane of symmetry) is zero. This results in yaw rate of the aircraft velocity vector which is:

$$R = (g/V) \cos \theta \sin \phi$$

The normal lift load factor, (1/g) times normal acceleration, is:

$$N_z = VQ/g + \cos \theta \cos \phi$$

First Alternative Definition of Commands

Vertical and horizontal plane components of the aircraft velocity vector turn rate are respectively:

$$\dot{\theta} = \cos \phi \, Q - \sin \phi \, R$$

$$\dot{\psi} = \frac{\cos \phi}{\cos \theta} R + \frac{\sin \phi}{\cos \theta} Q$$

If aircraft velocity vector pitch and yaw rates commands are selected such that $$Q_c = kK[\cos \phi \theta_e + \sin \phi \cos \theta \psi_e]$$

and $$R_c = kK[\cos \phi \cos \theta \psi_e - \sin \phi \theta_e]$$

and further, if Q and R are perfectly controlled to the commanded values, $Q_c$ and $R_c$ respectively, by a flight control system; then $$\dot{\theta} = kK\theta_e$$

and $$\dot{\psi} = kK\psi_e$$

as may be determined by substituting $Q_c$ and $R_c$ for Q and R, respectively, in the $\dot{\theta}$ and $\dot{\psi}$ equations.

If a target point is located in an absolute angular direction by horizontal plane bearing angle, $\psi_c$, and vertical plane elevation angle, $\theta_c$; then $\psi_e = \psi_c - \psi$ relates the horizontal plane relative bearing to the target point absolute bearing and the velocity vector absolute bearing, and $\theta_e = \theta_c - \theta$ relates the difference in vertical plane elevations to the target absolute elevation and the absolute velocity vector elevation. The relationships among these quantities are shown in FIG. 3.

For K a constant and a value of k which is continuously equal to 1.0, transfer functions relating the bearing and elevation to the absolute target angles are:

$$\theta/\theta_c = \frac{K}{S+K}$$

$$\psi/\psi_c = \frac{K}{S+K}$$

$$\psi/\theta_c = 0$$

$$\theta/\psi_c = 0$$

These transfer functions establish the bandwidth of the control process as K radians/unit time, and the independence of bearing and elevation control.

Again considering Q and R as perfectly controlled to the commanded values $Q_c$ and $R_c$, respectively, by the flight control system, the equations for R and $N_z$ are used to eliminate $Q_c$ and $R_c$ in the command equations by substitution.

$$gN_z/V - g\cos\theta\cos\phi/V = kK[\cos\phi\theta_e + \sin\phi\cos\theta\psi_e]$$

$$g/V\cos\theta\sin\phi = kK[\cos\phi\cos\phi\psi_e - \sin\phi\theta_e]$$

If the first of the above pair of equations is multiplied by $\sin\phi$ and the second is multiplied by $\cos\phi$, and the two resulting equations are added, the following equation is obtained.

$$(gN_z\sin\phi)/V = kK\cos\theta\psi_e$$

If the first equation of the above pair is multiplied by $\cos\phi$ and the second is multiplied by $(-\sin\phi)$, and the two resulting equations are added, the following equation is obtained.

$$(gN_z\cos\phi)/V = kK\theta_e + (g\cos\theta)/V$$

The bank angle which solves the two equations immediately above can be regarded as a bank angle command, $\phi_c$. The ratio of the last two equations when solved for $\phi$ with $\phi = \phi_c$ results in:

$$\phi_c = \tan^{-1}\left(\frac{\sin\phi}{\cos\phi}\right)$$

$$= \tan^{-1}\frac{kK\cos\theta\psi_e}{kK\theta_e + (g\cos\theta)/V}$$

Figure 6:
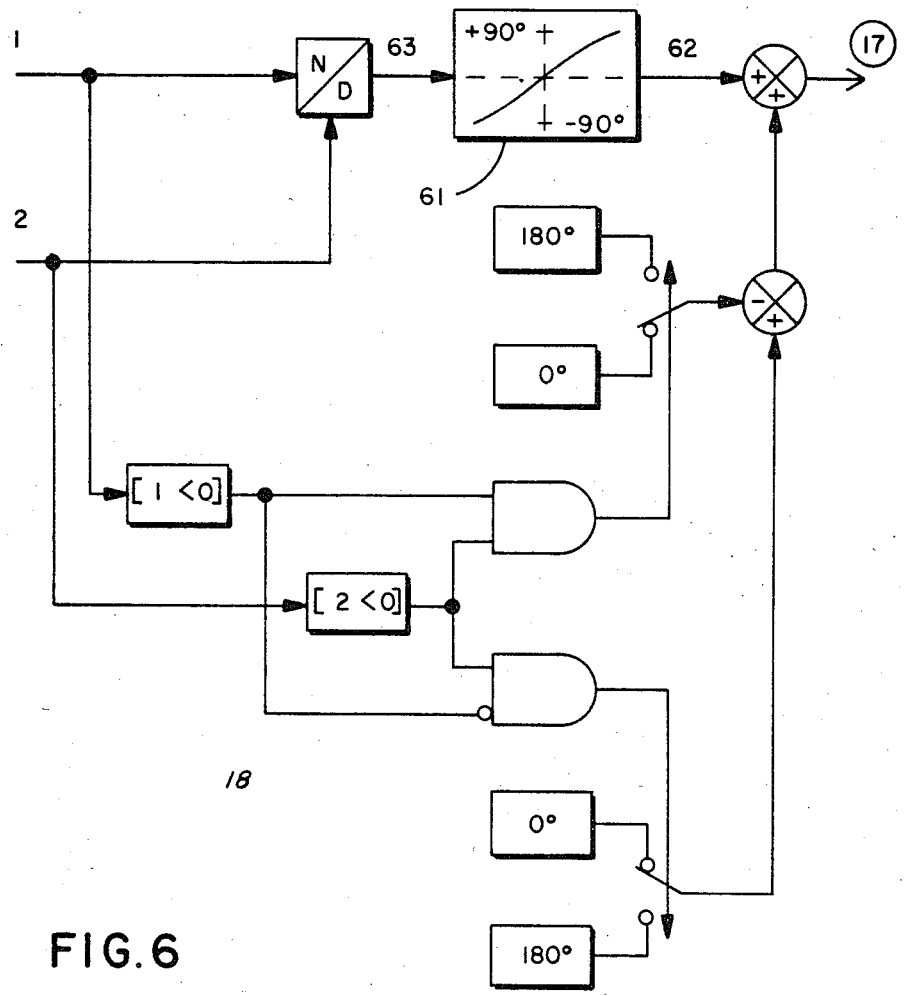
FIG. 6 is a schematic diagram representing the circuit of the bank angle command generator of FIG. 1.

The signal 17 representing the bank angle command, $\phi_c$, is generated by the bank angle command generator 18 in the block diagram of FIG. 1. FIG. 6 is a schematic diagram representing a circuit for generating the bank angle command signal 17 upon receipt of the enable signal 19. The nonlinear function 61 in FIG. 6 generates an output signal 62 representing the angle whose tangent is represented by the input signal 63.

If the lift load factor is required to be positive, the above equation for $\phi_c$ has four quadrant validity with consideration of the signs of the numerator and denominator of the inverse tangent function argument.

If the positive square root of the sum of the squares of the same two equations is formed and solved for $N_z$, that value of $N_z$ can be regarded as a lift load factor command, $N_{zc}$.

$$N_{zc} = V/g\sqrt{(kK\cos\theta\psi_e)^2 + (kK\theta_e + [g\cos\theta]/V)^2}$$

Figure 5:
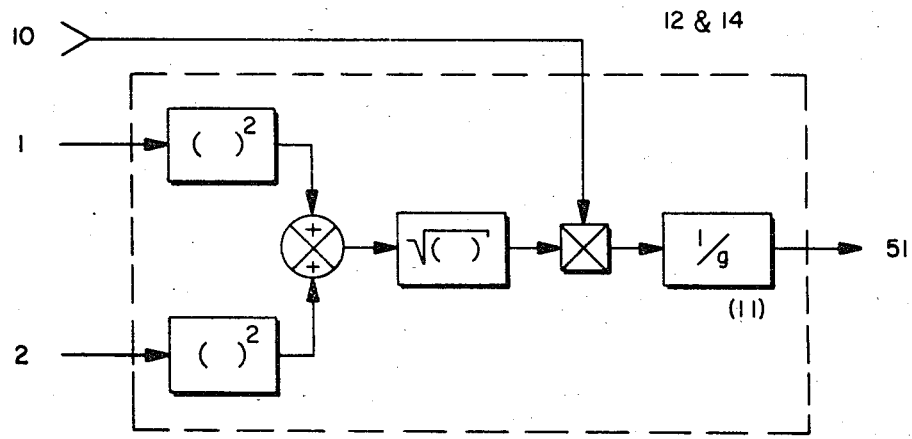
FIG. 5 is a schematic diagram representing the circuit of the trial lift load factor command generator of FIG. 1 and the circuit of the lift load factor command generator, also of FIG. 1, which is activated when certain conditions upon the trial lift load factor command signal are satisfied.

The signal 16 representing lift load factor command, $N_{zc}$, is generated by the lift load factor command generator 14 in the block diagram of FIG. 1. FIG. 5 is a schematic diagram representing a circuit which may be used for generating the lift load factor command signal 16 upon receipt of the enable signal 19. In this application of the circuit, the output signal 51 is the signal denoted by 16 in FIG. 1.

A predetermined upper limit, $N_{z\,max}$, can be imposed upon $N_{zc}$ by means of the lift load factor attenuation parameter, k. Consider $N_{zc}$ to be a function of k, $N_{zc}(k)$, and $\phi_c$ to be a function of k, $\phi_c(k)$. If $N_{zc}(1)$ is less than or equal to $N_{z\,max}$, then $N_{zc}(1)$ and $\phi_c(1)$ are acceptable commands. However, if $N_{zc}(1)$ is greater than $N_{z\,max}$, it is necessary to solve for k such that $N_{zc}(k) = N_{z\,max}$ to obtain acceptable commands. When these conditions are satisfied, the enable signal 19 in FIG. 1 is set. Otherwise, the enable signal is clear. This solution of k can be accomplished by numerical search, iteration or direct computation. The direct computation method solves the $N_{zc}$ equation for k with $N_{zc}$ set equal to $N_{z\,max}$. The result is:

$$k = \frac{\sqrt{(N_{zmax}^2 - \cos^2\theta)(\theta_e^2 + \psi_e^2\cos^2\theta) + \theta_e^2\cos^2\theta} - \theta_e\cos\theta}{KV(\theta_e^2 + \psi_e^2\cos^2\theta)/g}$$

Figure 8:
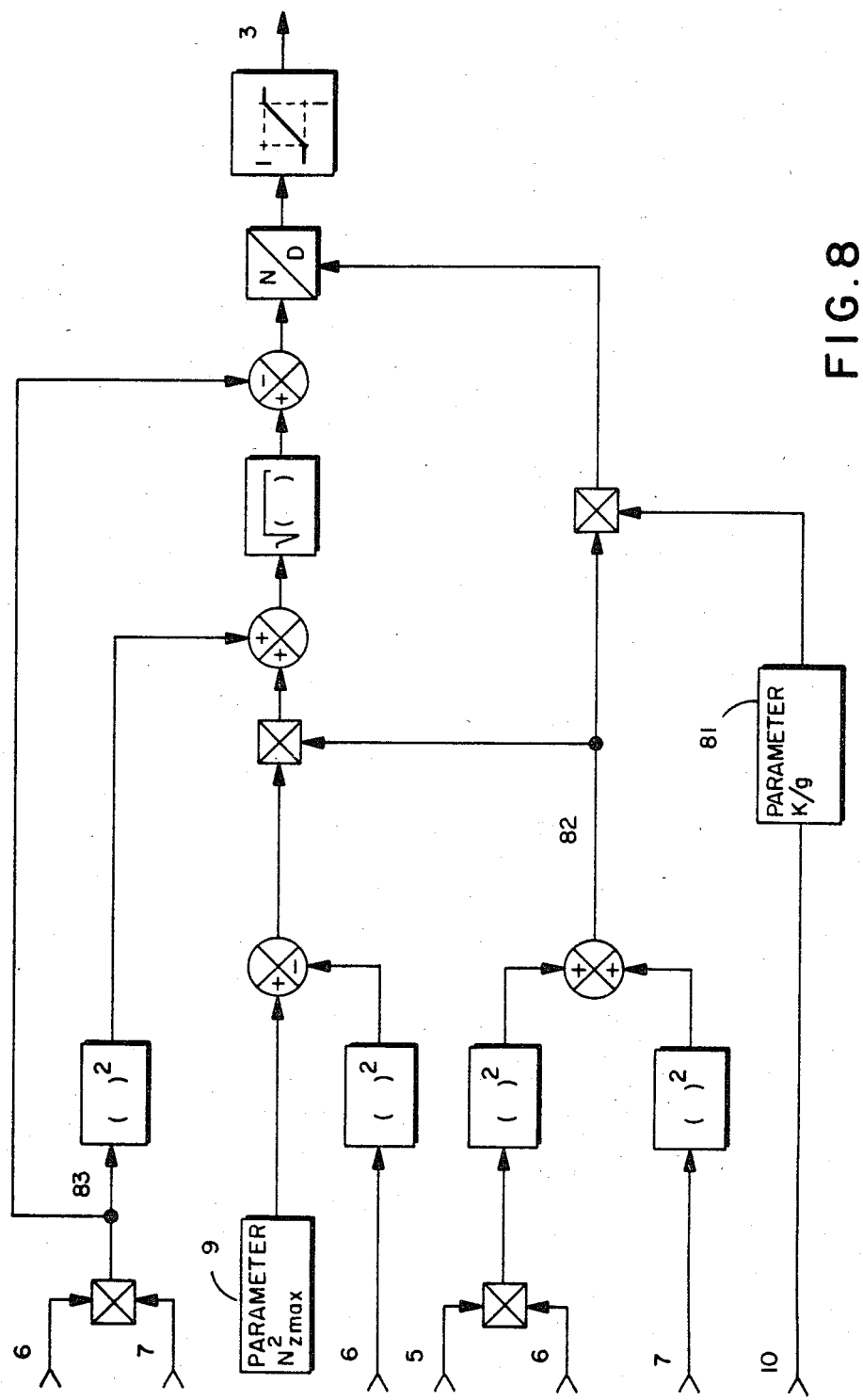
FIG. 8 is a schematic diagram representing the circuit which combines the functions of the trial lift load factor generator and the systematic adjuster, both of FIG. 1.

A circuit which may be used for generating the lift load factor attenuation signal 3 (representing the lift load factor attenuation parameter, k) by the direct computation method is shown in the schematic diagram of FIG. 8. When this direct computation method is implemented, the circuit of FIG. 8 replaces items 12, 13, 15, and 20 in the block diagram of FIG. 1, and the enable signal 19 is always set.

The bank angle command, $\phi_c(k)$, is then computed for the above value of k, and the lift load factor command, $N_{zc}(k)$, is less than or equal to $N_{z\,max}$.

Second Alternative Definition of Commands

Define the desired aircraft turn plane as containing the unit vectors in the aircraft direction of travel, $\bar{v}$, and in the direction of the line of sight from the aircraft to the target, $\bar{t}$. This definition of the desired turn plane is shown in FIG. 4. Let target angle, T, be the magnitude of the angle between $\bar{v}$ and $\bar{t}$. Target angle, T, is $$T = \tan^{-1}\frac{|\sin T|}{\cos T} = \tan^{-1}\frac{|\bar{v}\times\bar{t}|}{\bar{v}\cdot\bar{t}}$$

where R has two-quadrant validity in consideration of the sign of $\bar{v}\cdot\bar{t}$. Target angle may also be represented as a vector, $\bar{T}$, given by:

$$\bar{T} = T\frac{\bar{T}}{|\bar{T}|} = T\frac{\bar{v}\times\bar{t}}{|\bar{v}\times\bar{t}|}$$

Aircraft flight path axis components of $\bar{T}$ are $$T_V = 0$$

$$T_q = F[\cos\phi(\cos\theta\sin\theta_c - \sin\theta\cos\theta_c\cos\psi_e) + \sin\phi(\cos\theta_c\sin\psi_e)]$$

$$T_r = F[\cos\phi(\cos\theta_c\sin\psi_e) - \sin\phi(\cos\theta\sin\theta_c - \sin\theta\cos\theta_c\cos\psi_e)]$$

as may be verified by evaluating the vector cross- and dot-product components using a value for the scale factor, F, given by:

$$F = \frac{sgn(C)\sin^{-1}\sqrt{1-C^2} + [1 - sgn(C)]\pi/2}{\sqrt{1-C^2}}$$

$$C = \bar{v}\cdot\bar{t} = \cos\theta\cos\theta_c\cos\psi_e + \sin\theta\sin\theta_c$$

This is equivalent to:

$$F = \left(\frac{\sin T}{T}\right)^{-1}$$

Figure 9:
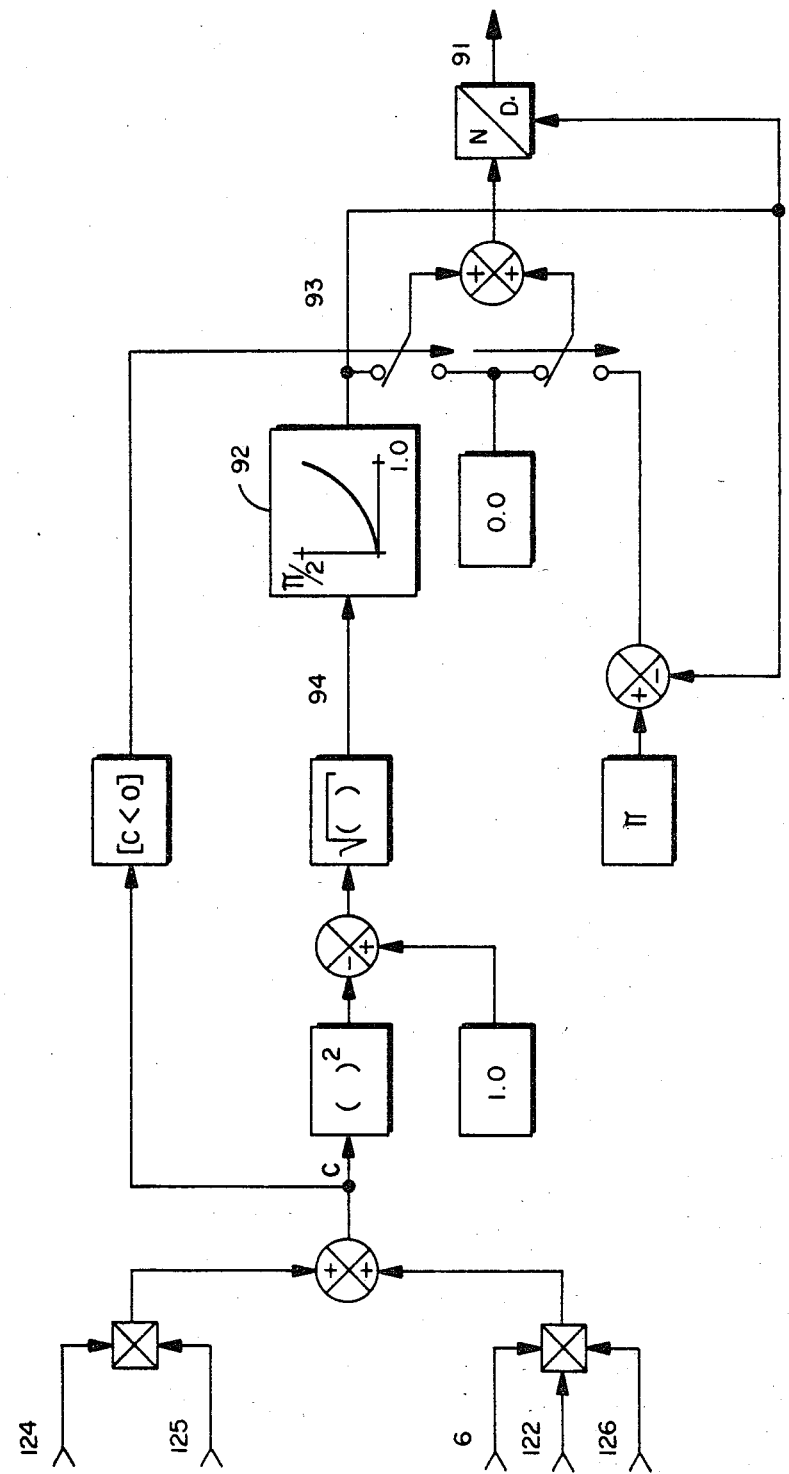
FIG. 9 is a schematic diagram representing the circuit for generating the scale factor used in FIG. 10.

A signal 91 representing the scale factor, F, may be generated by the circuit represented in the schematic diagram of FIG. 9. The generated signal 91 is an input to the block diagram shown in FIG. 10. The nonlinear function 92 in FIG. 9 generates an output signal 93 representing the angle whose sine is represented by the input signal 94.

If aircraft velocity vector pitch and yaw rate commands are selected such that $$Q_c = kKT_q$$

and $$R_c = kKT_r,$$

then the aircraft velocity vector turn rate command is in the desired turn plane. Consequently the aircraft velocity vector is commanded directly toward the target at every instant of time.

If Q and R are perfectly controlled to the commanded values, $Q_c$ and $R_c$ respectively, by a flight control system; and the target is sufficiently far from the aircraft that the aircraft flight path axis components of T are approximately $Q_c$ and $R_c$; for K a constant and a value of k which is continuously equal to one, the transfer function relating target, T, angle to its initial value, $T_o$, is:

$$T/T_o = \frac{1}{S + K}$$

This transfer function establishes the bandwidth of the control process as K radians/unit time.

Again considering Q and R as perfectly controlled to the commanded values $Q_c$ and $R_c$, respectively, by the flight control system; the equations for R and $N_z$ are used to eliminate $Q_c$ and $R_c$ in the command equations by substitution. Upon solving for $(gN_z \sin \phi)/V$ and for $(gN_z \cos \phi)/V$:

$$(gN_z \sin \phi)/V = kKF \cos \theta_c \sin \psi_e$$

$$(gN_z \cos \phi)/V = kKF(\cos \theta \sin \theta_c - \sin \theta \cos \theta_c \cos \psi_e) + (g \cos \theta)/V$$

The remaining steps in obtaining the bank angle command, $\phi_c$, and the lift load factor command, $N_{zc}$, are identical to those used in the case of the first alternative definition of commands. The results are:

$$\phi_c = \tan^{-1} \frac{kKF \cos \theta_c \sin \psi_e}{[kKF (\cos \theta \sin \theta_c - \sin \theta \cos \theta_c \cos \psi_e) + (g \cos \theta)/V]}$$

$$N_{zc} = V/g \; \{[kKF \cos \theta_c \sin \psi_e]^2 + [kKF (\cos \theta \sin \theta_c - \sin \theta \cos \theta_c \cos \psi_e) + (g \cos \theta)/V^2]\}^{\frac{1}{2}}$$

$$k = \frac{\sqrt{(N_{zmax}^2 - \cos^2 \theta)a + b^2} - b}{KFVa/g}$$

-continued $$a = \cos^2 \theta_c \sin^2 \psi_e + \cos^2 \theta \sin^2 \theta_c + \sin^2 \theta \cos^2 \theta_c \cos^2 \psi_e - 2 \cos \theta \sin \theta_c \sin \theta \cos \theta_c \cos \psi_e$$

$$b = (\cos \theta \sin \theta_c - \sin \theta \cos \theta_c \cos \psi_e) \cos \theta$$

The signals 116 and 117, respectively, of FIG. 10 representing lift load factor command, $N_{zc}$, and bank angle command, $\phi_c$, are generated by the lift load factor command generator 114 and the bank angle command generator 118 of FIG. 10. FIG. 5 represents a circuit which may be used for generating the lift load factor command signal 116 upon receipt of the enable signal 119. In this application of the circuit, signals 1, 2, and 51 in FIG. 5 are replaced by signals 101, 102, and 116 respectively. The circuit of FIG. 6 may be used for generating the bank angle command signal 117 upon receipt of the enable signal 119. In this application of the circuit, signals 1, 2, and 17 in FIG. 6 are replaced by signals 101, 102, and 117 respectively.

When the load factor attenuation parameter, k, is determined such that k takes on the maximum value between zero and one, and the trial lift load factor command is less than or equal to the predetermined upper limit, $N_{z \; max}$, the enable signal 119 in FIG. 10 is set. Otherwise, the enable signal is clear.

A circuit useful for generating the lift load factor attenuation signal 103 (representing the lift load factor attenuation parameter, k) by the direct computation method is shown in FIG. 8. In this application, signal 3 in FIG. 8 is replaced by signal 103, and signals 82 and 83 in FIG. 8 are replaced by signals representing quantities a and b, respectively, as defined by the above equations. When this direct computation method is implemented, the circuit of FIG. 8, as described above, replaces items 112, 113, 115 and 20 in the block diagram of FIG. 10, and the enable signal 119 is always set.

Application of Commands to Flight Control System

The resulting commands can be coupled to the aircraft flight control system according to the following equations:

$$Q_c = g (N_{zc} - \cos\theta \cos\phi)/V$$
$$P_c = K_\phi (\phi_c - \phi) - \tan\theta (Q \sin \phi + R \cos \phi)$$
$$\approx K_\phi (\phi_c - \phi)$$

In certain circumstances it may be desirable to replace the lift load factor command, $N_{zc}$, with a modified lift load factor command, $N_{zc}^*$.

Modified Lift Load Factor Command

The lift load factor command, $N_{zc}$, may be used as it stands. However, with additional processing, a modified lift load factor command, $N_{zc}^*$, is obtained which minimizes the path turn rate error during the bank angle, $\phi$, response transient. The modified lift load factor command, $N_{zc}^*$, can be used in place of the (unmodified) lift load factor command, $N_{zc}$, in the above equations describing command coupling to the aircraft flight control system. This feature has significant appeal for applications where precise path control is required.

When the modified lift load factor command is used in place of the unmodified command, the effect is to unload the aircraft substantially during the bank angle response transient while large changes in aircraft bank angle are commanded.

Minimization of path turn rate is equivalent to minimizing the square of the path turn rate error which is:

$$[(Q_c \cos \phi_c - R_c \sin \phi_c) - (Q \cos \phi - R \sin \phi)]^2 + [(Q_c \sin \phi_c + R_c \cos \phi_c) - (Q \sin \phi + R \cos \phi)]^2$$

The quantities in parentheses are the components of path turn rate in a roll stabilized axis system. The differences are between commanded and actual turn rate components. If the aircraft is flown in a coordinated manner and if the pitch rate response, Q, to the modified lift load factor command, $N_{zc}^*$, is immediate then:

$$R = g/V \cos \theta \sin \phi$$

$$Q = g/V(N_{zc}^* - \cos \theta \cos \phi)$$

$$Q_c = g/V(N_{zc} - \cos \theta \cos \phi_c)$$

$$R_c = g/V \cos \theta \sin \phi_c$$

Substitution of the four equations above into the expression for the square of the path turn rate error results in:

$$(g/V)^2[N_{zc}^{*2} - 2N_{zc}^* N_{zc} \cos(\phi_c - \phi) + N_{zc}^2]$$

This quantity is minimized with respect to $N_{zc}^*$ subject to the restriction that $$N_{zmax} \geq N_{zc}^* \geq 0$$

by:

$$N_{zc}^* = N_{zc} \cos(\phi_c - \phi), \cos(\phi_c - \phi) \geq 0$$

$$N_{zc}^* = 0, \cos(\phi_c - \phi) < 0$$

Figure 7:
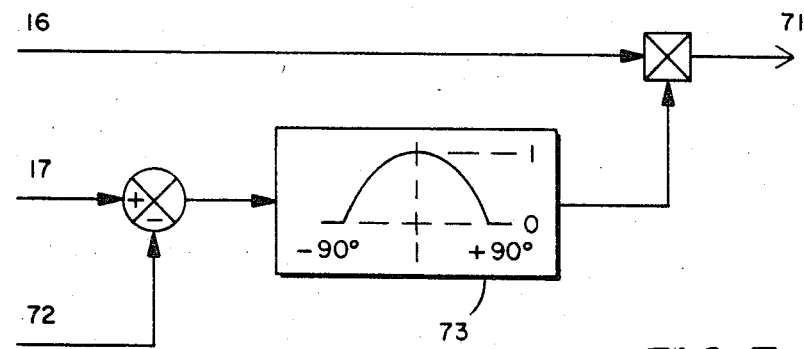
FIG. 7 is a schematic diagram representing the circuit for modifying the lift load factor command signal output of FIG. 1.

The signal 71 representing the modified lift load factor command may be generated as shown in FIG. 7. This signal is dependent upon signals 16, 17 and 72 respectively representing the (unmodified) lift load factor command, $N_{zc}$, bank angle command, $\phi_c$, and aircraft bank angle, $\phi$. The nonlinear function element 73 implements the cosine of the bank angle error function for a range of error magnitude from zero to ninety degrees.

Alternatively, the signal representing modified lift load factor may be generated as shown in FIG. 7, but using alternative signals 116 and 117 in place of signals 16 and 17 respectively representing (unmodified) lift load factor command, $N_{zc}$, and bank angle command, $\phi_c$.

The magnitude of the turn rate error for the modified lift load factor command, $N_{zc}^*$, above is $$gN_{zc}\sqrt{1 - \cos^2(\phi_c - \phi)} / V, \cos(\phi_c - \phi) \geq 0$$

$$gN_{zc}/V, \cos(\phi_c - \phi) < 0$$

whereas for the (unmodified) lift load factor command, $N_{zc}$, it is:

$$\sqrt{2} \; g N_{zc} \sqrt{1 - \cos(\phi_c - \phi)} / V$$

While a large angle, gravity compensated, bank-to-turn pursuit controller has been described in what is presently considered to be a preferred embodiment of the invention, it will be apparent to those skilled in the art that various changes and modifications may be made in the structure and in the instrumentalities utilized without departing from the true spirit and scope of the invention.

We claim:

1. A system for accomplishing bank-to-turn pursuits steering of an aircraft; comprising:
   means for generating a lift load factor attenuation signal;
   means for generating first and second signals representing the components of commanded path turn rate in the transverse and vertical planes respectively, the latter being compensated for gravitational path turn rate, the said first and second signals varying in response to and as a function of the lift load factor attenuation signal;
   means for generating a lift load factor command signal which is less than or equal to a predetermined limit, the said lift load factor command signal generating means having as inputs the first and second signals and gravitational and aircraft performance input components;
   means for generating a bank angle command signal for use with the lift load factor command signal, the said bank angle command signal generating means having inputs of the said first and second signals, and adjusted as a function of the lift load attenuation command signal; and
   means for coupling said bank angle command signal and said lift load factor command signal to the aircraft bank and lift adjusting control surface elements to modify the aircraft bank angle and lift.

2. A system for accomplishing bank-to-turn pursuit steering of an aircraft; comprising:
   means for generating lift load factor attenuation signals having an initial value of unity;
   means for generating a first signal representing the commanded path turn rate in the transverse plane in response to and as a function of lift load factor attenuation signal;
   means for generating a second signal representing commanded turn rate in the vertical plane compensated for gravitational path turn rate in response to and as a function of the lift load factor attenuation signal;
   means for generating a trial lift load factor command signal, the trial lift load factor command signal generating means having inputs from said first and second signal;
   means for comparing trial lift load command signal with a signal representing a pre-determined upper limit; and means for modifying the said initial lift load factor attenuation signal value of unity when the trial lift load factor command signal exceeds the pre-determined upper limit;
   means for generating a lift load factor command signal when the trial lift load command signal is less than or equal to the upper limit, said lift load factor command generating means having inputs of the said first and second signals;
   means for generating a bank angle command signal when the trial lift load factor command signal is less than or equal to the said predetermined upper limit, said bank angle command signal generating means having inputs of the said first and second signals;
   means for coupling said bank angle command and lift attenuation signals to th aircraft bank angle lift adjusting surface control elements to modify the aircraft bank angle and lift.

* * * * *